US012520401B2

(12) United States Patent
Reyes et al.

(10) Patent No.: US 12,520,401 B2
(45) Date of Patent: Jan. 6, 2026

(54) ROAD INNOVATION LIGHTING DEVICES

(71) Applicants: Alberto Camilo Reyes, Orlando, FL (US); Camilo Alberto Reyes, Orlando, FL (US)

(72) Inventors: Alberto Camilo Reyes, Orlando, FL (US); Camilo Alberto Reyes, Orlando, FL (US)

( * ) Notice: Subject to any disclaimer, the term of this patent is extended or adjusted under 35 U.S.C. 154(b) by 0 days.

(21) Appl. No.: 18/970,561

(22) Filed: Dec. 5, 2024

(65) Prior Publication Data

US 2025/0185137 A1 Jun. 5, 2025

Related U.S. Application Data

(60) Provisional application No. 63/606,518, filed on Dec. 5, 2023.

(51) Int. Cl.

| | |
|---|---|
| ***H05B 45/50*** | (2022.01) |
| ***F21S 8/00*** | (2006.01) |
| ***F21V 15/01*** | (2006.01) |
| ***F21V 21/02*** | (2006.01) |
| ***F21V 23/00*** | (2015.01) |
| ***F21W 131/103*** | (2006.01) |
| ***F21Y 115/10*** | (2016.01) |

(52) U.S. Cl.

CPC .............. *H05B 45/50* (2020.01); *F21S 8/032* (2013.01); *F21V 15/01* (2013.01); *F21V 23/002* (2013.01); *F21V 23/003* (2013.01); *F21V 21/02* (2013.01); *F21W 2131/103* (2013.01); *F21Y 2115/10* (2016.08)

(58) Field of Classification Search

CPC .......... H05B 45/50; F21S 8/032; F21V 15/01; F21V 23/002; F21V 23/003

See application file for complete search history.

(56) References Cited

U.S. PATENT DOCUMENTS

| | | | | |
|---|---|---|---|---|
| 9,255,670 | B2 * | 2/2016 | Oostdyk | F21V 29/70 |
| 10,244,086 | B2 * | 3/2019 | Newman, Jr. | H04L 12/2803 |
| 10,733,878 | B2 | 8/2020 | Soltesz et al. | |
| 10,863,604 | B2 * | 12/2020 | Jayawardena | H05B 47/175 |

(Continued)

FOREIGN PATENT DOCUMENTS

KR 20100009556 U 9/2010

OTHER PUBLICATIONS

Roadway, retrieved on the internet, retrieved on Dec. 5, 2024; <URL: https://www.cooperlighting.com/global/product-list#c=cooper-lighting:product-category/outdoor/roadway>.

(Continued)

*Primary Examiner* — Bryon T Gyllstrom

(57) ABSTRACT

A lighting device for roadway illumination is disclosed, comprising a projector LED lighting assembly housed within a housing. The housing includes at least one slot tilted at an angle relative to a horizontal reference plane, enabling the emitted light to be directed in an angular fashion. The slot is configured to guide the light at an angle ranging from approximately 1 to 20 degrees downward, optimizing illumination for roadways, streets, and other ground-level applications. The device enhances visibility and safety by providing controlled, directional lighting while maintaining a versatile and durable design suitable for various outdoor environments.

20 Claims, 9 Drawing Sheets

(56) References Cited

U.S. PATENT DOCUMENTS

| | | | | | |
|---|---|---|---|---|---|
| 2005/0036323 | A1* | 2/2005 | Baken | H01Q 1/1207 | 362/382 |
| 2007/0285912 | A1* | 12/2007 | Lin | H01Q 1/06 | 362/4 |
| 2009/0040750 | A1* | 2/2009 | Myer | H10F 77/68 | 136/246 |
| 2010/0283605 | A1* | 11/2010 | Nevins | F21S 8/086 | 362/310 |
| 2011/0060701 | A1* | 3/2011 | Verfuerth | F21V 23/0478 | 315/129 |
| 2012/0235579 | A1* | 9/2012 | Chemel | F21V 15/01 | 315/152 |
| 2015/0276192 | A1* | 10/2015 | Kafry | H05B 47/19 | 362/362 |
| 2017/0267162 | A1* | 9/2017 | Remillard | B60Q 1/0023 | |
| 2020/0260562 | A1* | 8/2020 | Vendetti | F21V 23/06 | |
| 2021/0160994 | A1* | 5/2021 | Vendetti | F21V 23/06 | |

OTHER PUBLICATIONS

LED Street And Roadway Lighting, retrieved from the internet, retrieved on Dec. 5, 2024; <URL: https://commercialledlights.com/outdoor-lighting/street-roadway-lights/>.

* cited by examiner

ROAD INNOVATION LIGHTING DEVICES

FIELD OF THE INVENTION

The present invention generally relates to a lighting device. More specifically, the present invention relates to a road lighting device to ensure optimal illumination and safety.

BACKGROUND OF THE INVENTION

Roadway lighting devices are essential for ensuring optimal illumination and safety on public roads; however, designing effective systems presents several challenges.

Traditional public lighting technologies rely heavily on elevated streetlight poles to provide illumination. While these systems are widely used, they face critical issues that limit their effectiveness and efficiency.

One major challenge is balancing cost efficiency with the need for reliable and safe illumination. Elevated streetlights are regulated to avoid dazzling drivers, which often results in limited light intensity and suboptimal road illumination. Additionally, obstructions such as trees, signage, or other roadside structures can block light, creating dark spots and uneven illumination. Poor lighting uniformity not only reduces visibility but also increases the risk of accidents, especially in areas with high traffic or complex road layouts.

Another significant issue is the safety hazard posed by the streetlight poles themselves. Vehicle collisions with streetlight poles are a common occurrence, leading to potential injuries, property damage, and costly repairs. Furthermore, the financial burden associated with these systems is substantial, encompassing the purchase, installation, maintenance, and eventual removal of the poles. These cost implications make traditional roadway lighting systems less feasible for certain regions or applications.

In addition to these challenges, roadway lighting systems must comply with strict industry standards and regulations, which govern parameters such as brightness, glare control, and uniformity. Meeting these requirements while maintaining cost-effectiveness is a persistent challenge for designers and manufacturers. Environmental concerns further complicate the design process, as there is increasing demand for solutions that minimize light pollution and reduce energy consumption, contributing to more sustainable infrastructure.

Therefore, there is a pressing need to develop improved roadway lighting devices that address these issues. Such devices must overcome the limitations of traditional elevated lighting systems by providing enhanced illumination, minimizing glare, improving uniformity, and eliminating dark spots caused by obstructions. They must also mitigate safety risks associated with light poles, reduce costs, and comply with regulatory standards, all while minimizing environmental impact. Solving these challenges will lead to safer, more efficient, and sustainable roadway lighting solutions.

The present invention is intended to solve the problems associated with conventional devices and methods and provide improvements on these devices.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present invention relates to a lighting device for roadway illumination, designed to enhance visibility and safety while addressing operational reliability, maintenance efficiency, and compliance with industry standards.

The device of the present invention comprises a projector LED lighting assembly housed within a housing, the housing including a slot configured to direct light emitted by the projector LED lighting assembly for low-profile or ground-level illumination of roadways.

In one embodiment, the lighting device is equipped with a failure detection system operatively connected to the projector LED lighting assembly. The failure detection system is configured to monitor the operational status of the lighting assembly and detect malfunctions.

In one embodiment, an artificial intelligence (AI) module is integrated with the failure detection system and is configured to analyze real-time operating data in comparison with stored historical data to identify operational issues. The AI module is further configured to autonomously execute software-based repairs for software-related malfunctions and to generate notifications alerting users when physical components require replacement.

The device further includes electrical wiring and cables to provide power and communication connectivity between the projector LED lighting assembly, the failure detection system, and the AI module. A controller can be electrically connected to the projector LED lighting assembly and configured to regulate the power supply and manage the operation of the lighting assembly. Additionally, in one embodiment, a maintenance and monitoring system is operatively connected to the failure detection system and the AI module, enabling real-time performance tracking and operational status reporting.

The disclosed lighting device is specifically designed to provide efficient, uniform, and glare-free illumination while minimizing maintenance requirements and operational downtime. By integrating advanced failure detection and AI-driven diagnostics, the invention addresses critical challenges in roadway lighting systems, ensuring enhanced safety, reliability, and cost-effectiveness.

DETAIL DESCRIPTIONS OF THE INVENTION

Figure 1:
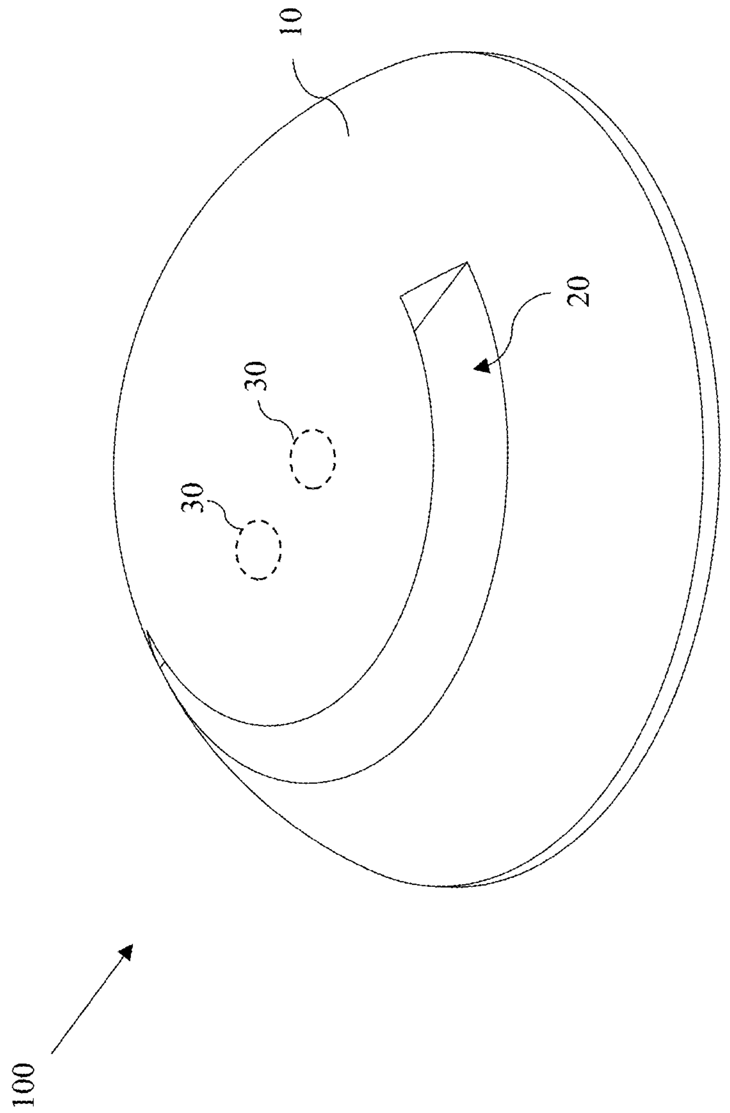
FIG. 1 is an illustration of one embodiment of the present invention.
Figure 2:
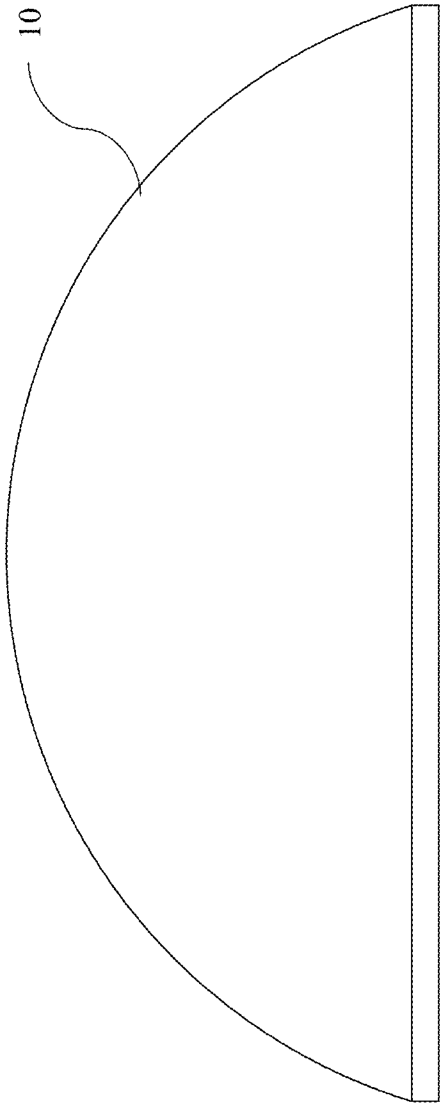
FIG. 2 is an illustration of a rear view of the present invention.
Figure 3:
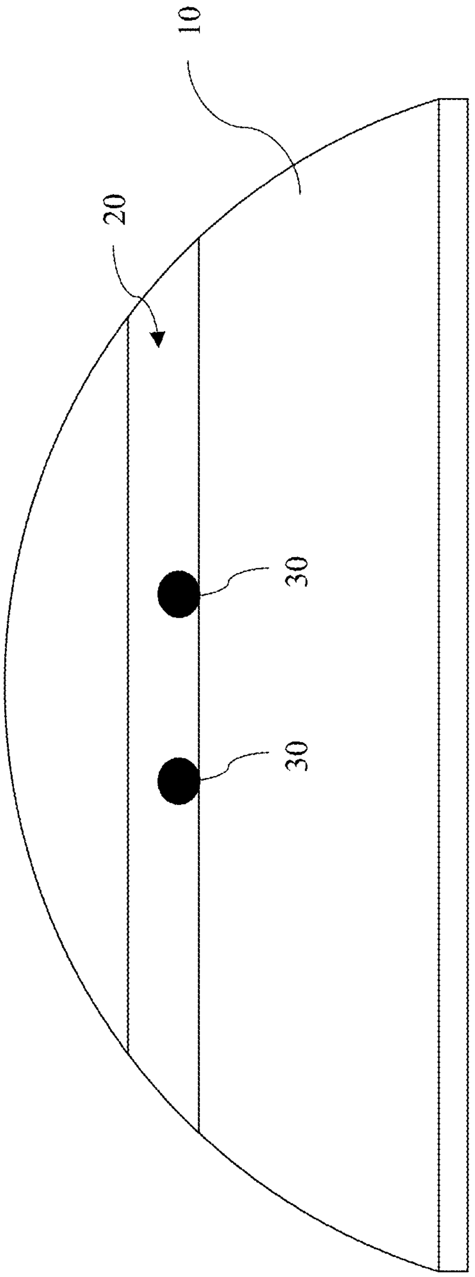
FIG. 3 is an illustration of a front view of the present invention.
Figure 4:
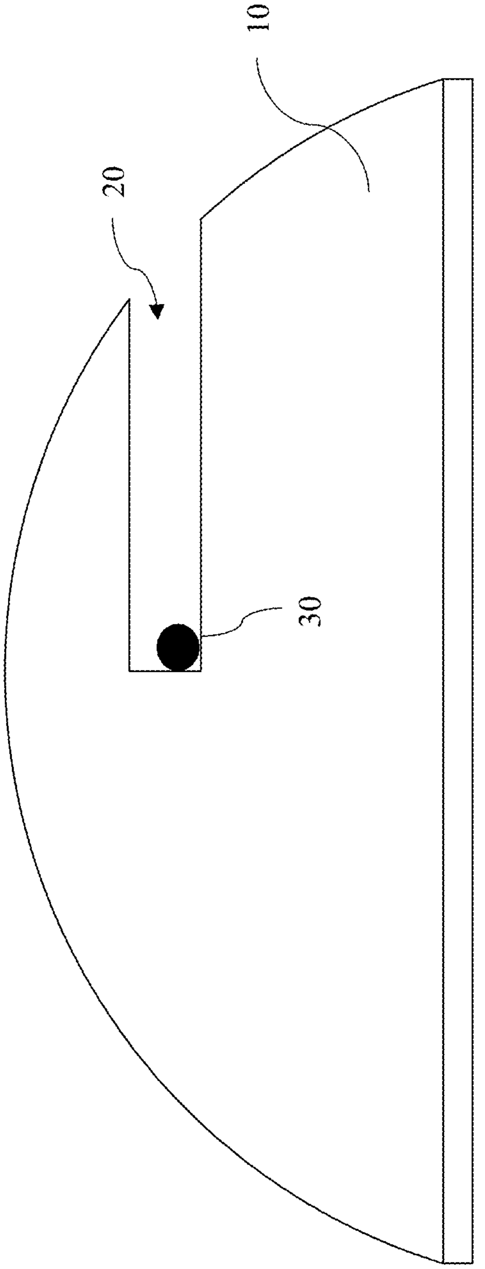
FIG. 4 is an illustration of a side view of the present invention.

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and is made merely for the purposes of providing a full and enabling disclosure. The detailed disclosure herein of one or more embodiments is not intended, nor is it to be construed, to limit the scope of patent protection afforded in any claim of a patent issuing herefrom, which scope is to be defined by the claims and the equivalents thereof. It is not intended that the scope of patent protection be defined by reading into any claim limitation found herein and/or issuing herefrom that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings. Accordingly, the following detailed description does not limit the disclosure. Instead, the proper scope of the disclosure is defined by the claims found herein and/or issuing herefrom. The present disclosure contains headers. It should be understood that these headers are used as references and are not to be construed as limiting upon the subject matter disclosed under the header. The present disclosure includes many aspects and features. Moreover, while many aspects and features relate to, and are described in the context of systems, apparatuses, and devices for roadway illumination using low-profile lighting devices, embodiments of the present disclosure are not limited to use only in this context. For example, the disclosed lighting device and system may be adapted for use in other applications, such as pedestrian pathways, parking lots, or industrial facilities, where low-profile or ground-level lighting is advantageous.

As shown in FIGS. 1-8, the present invention provides a lighting device 100 comprising a lighting assembly 30, a failure detection system 50, electrical wiring and cables 11, transformers or controllers 60, sensors or timers 12, and a maintenance and monitoring system 70. These components are integrated into a unified system 100 designed to illuminate roads, streets, and highways from a low-profile or ground-level position, enhancing visibility and safety for public use.

The present invention is modular and adaptable, allowing for variations in design, materials, and configurations to meet diverse roadway lighting requirements.

Additionally, the lighting device 100 may incorporate innovative features such as a novel lighting angle, protective housing 10, and advanced control mechanisms, making it a superior alternative to traditional elevated streetlight systems.

Lighting Assembly 30

The lighting assembly 30 of the present invention can be a projector LED lighting assembly that serves as the primary source of illumination. It utilizes high-efficiency LED lights, which are known for their long operational life, low energy consumption, and superior brightness. The assembly 30 is designed to emit focused and directional light, ensuring optimal illumination of road surfaces while minimizing light pollution. The light source is capable of projecting a high-intensity beam at an adjustable angle between 1° and 20°, ensuring precise and uniform illumination of road surfaces.

In preferred embodiment, the lighting assembly 30 is mounted at a height of 10-30 cm above ground level, providing a low-profile design that enhances visibility without dazzling drivers.

In one embodiment, the LED lighting assembly 30 is electrically connected to the transformer or controller 60, which regulates the power supply and manages the intensity and timing of the light. The failure detection system 50 (described below) may be configured to monitor the operational status of the LED assembly 30, while sensors and timers 12 provide input to adjust the lighting based on environmental conditions.

In one embodiment, the LED assembly 30 is mounted on a base structure (housing 10), which allows for precise positioning and adjustment of the light beam angle.

The housing of the LED assembly 30 or the housing 10 of the device, that includes the LED assembly 30, can be constructed from materials such as aluminum, stainless steel, or high-strength polymers, providing durability and resistance to environmental factors like moisture, dust, and impact.

The shape of the housing 10 of the present invention may vary, including circular, rectangular, elliptical, or dome-like designs, depending on the specific lighting requirements. A dome-like shape, as illustrated in FIGS. 1-6, is particularly advantageous due to its structural integrity, ease of manufacturing, and ability to provide uniform light distribution. This design also offers an aesthetically pleasing appearance and can be adapted for various applications. While a round shape is generally preferred for its simplicity and efficiency, other shapes may be utilized to accommodate specific aesthetic or functional needs. For instance, rectangular housings may be used for applications requiring a broader light spread, while elliptical designs may be employed to focus light in a specific direction or area.

Figure 5:
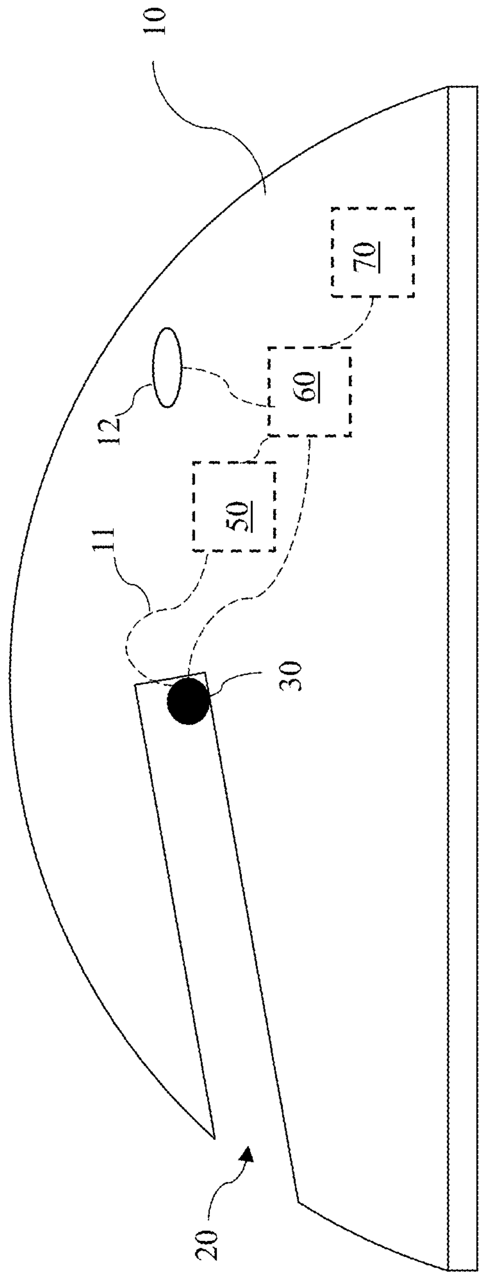
FIG. 5 is a side view illustration of the present invention, showing a tilted slot formed in the housing and internal components arranged within the housing.
Figure 6:
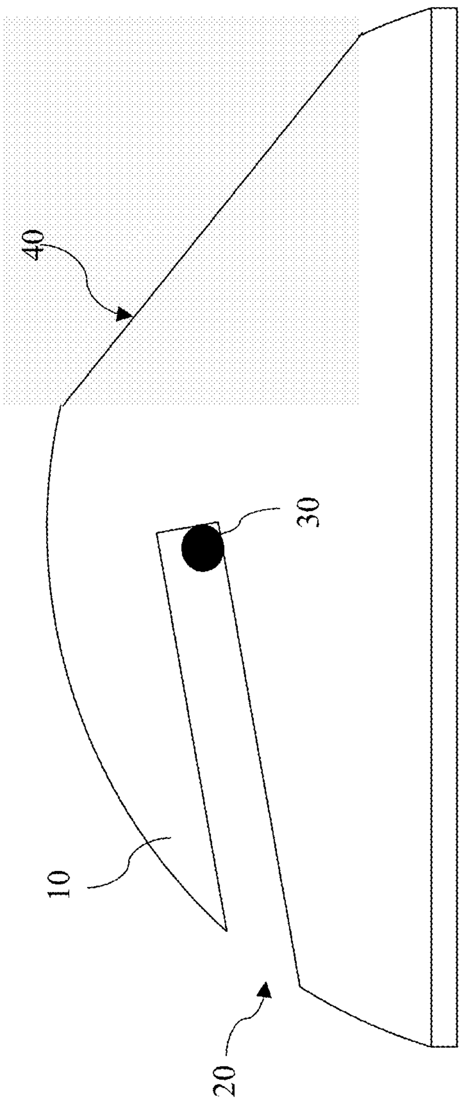
FIG. 6 is a side view illustration of the present invention, showing a sloped back included in the housing.
Figure 7:
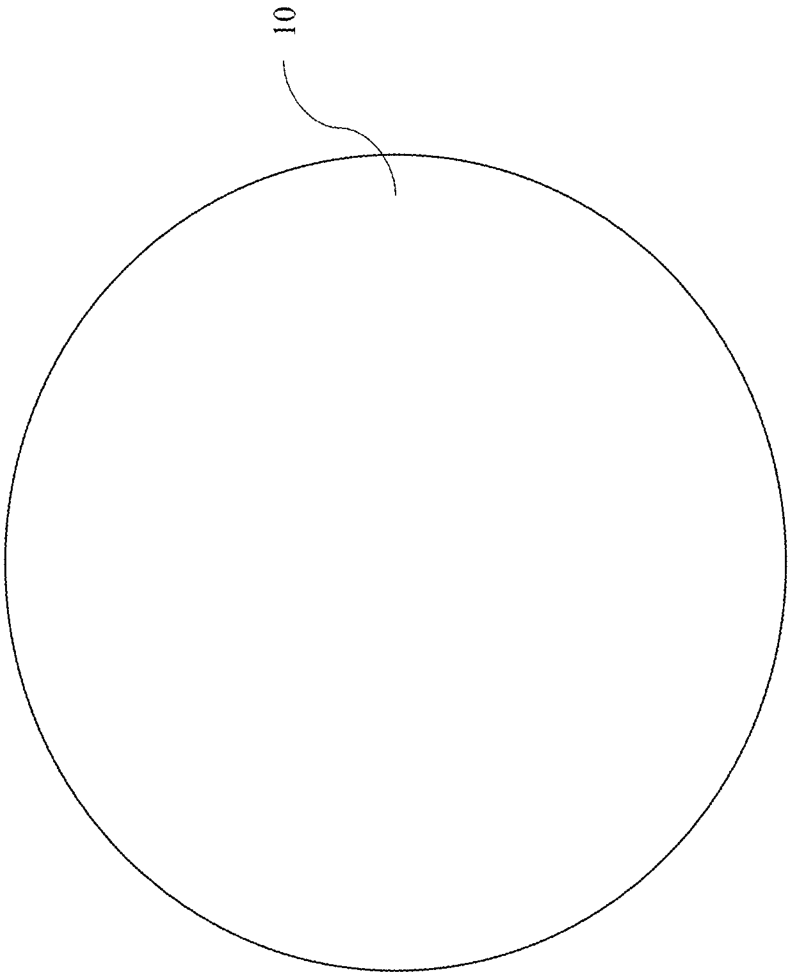
FIG. 7 is a bottom view of the present invention.
Figure 8:
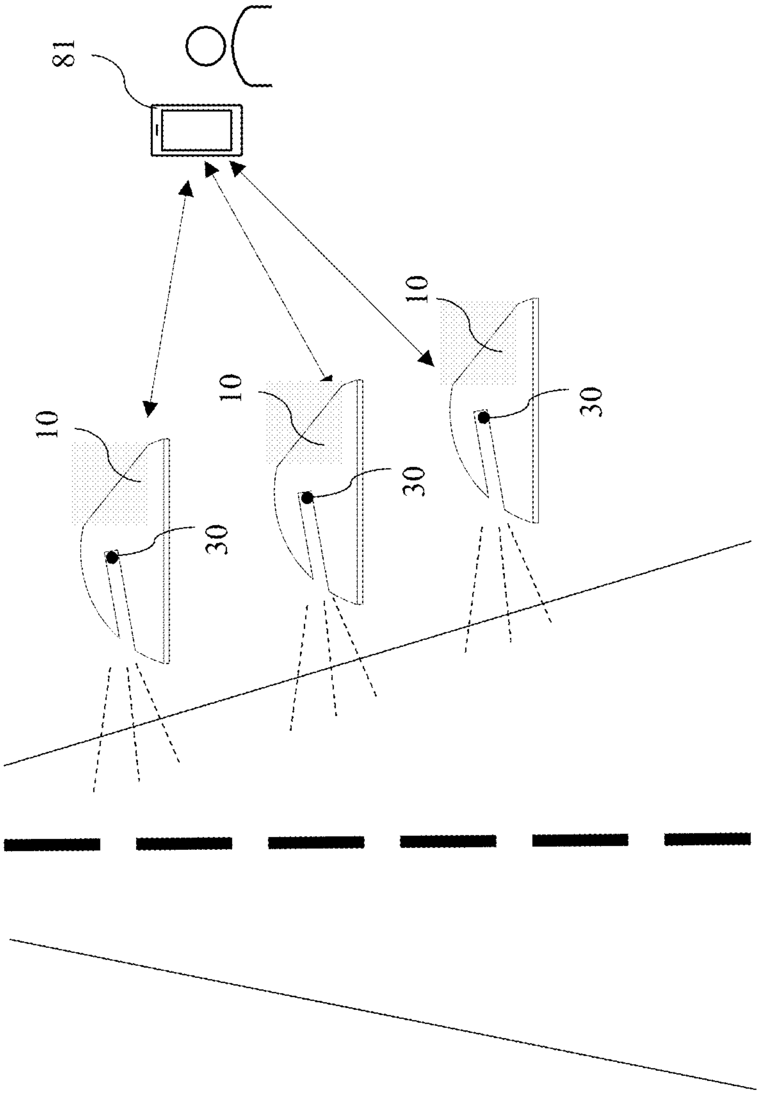
FIG. 8 is an illustration of the present invention as installed on a roadway.

In preferred embodiment, the housing 10, as shown in FIGS. 1-8, is hermetically sealed to ensure durability and can withstand weights of up to 300 kg, making it suitable for installation in high-traffic areas. Additionally, the housing 10 may include a sloped back 40, as shown in FIG. 6, as an optional feature. This sloped design can enhance the functionality of the housing 10 by improving airflow, reducing dust accumulation, or providing a streamlined appearance. The slope 40 may also facilitate easier mounting or integration into specific architectural designs, further increasing the versatility of the housing 10.

The type of LED lights used can also vary, such as warm white, cool white, or RGB LEDs, to suit different applications. The angle of the light beam can be adjusted using an angular slot 20 integrated into the dome-shaped housing 10.

In preferred embodiment, the dome-shaped housing 10 includes at least one slot 20, the slot 20 being tilted at an angle relative to a horizontal reference plane of the housing 10. This slot 20 is specifically configured to direct light emitted by the projector LED lighting assembly 30 at an angular direction, allowing the emitted light to form an angle approximately 1 to 20 degrees downward relative to the horizontal plane. This design ensures precise control over the direction of the light beam, enabling both narrow and wide beam configurations depending on the application.

In one embodiment, the slot 20 is positioned on the upper portion of the dome-like housing 10, approximately halfway between the apex of the dome 10 and its base. The slot 20 can be oriented at a downward angle relative to the tangent of the dome's curved surface at its location.

The slot 20 can be proportionally small compared to the overall size of the dome housing 10, ensuring minimal disruption to the structural integrity of the housing 10 while maintaining its functionality.

In some embodiments, the slot's placement can be strategically located within the upper hemisphere of the dome 10.

Thus, in one embodiment, as shown in FIG. 5, the dome-shaped housing 10 may include: a curved outer surface defining an upper portion and a lower portion, a slot 20 formed in the upper portion of the housing 10, the slot 20 being positioned approximately midway between the apex of the dome 10 and the base of the housing 10, wherein the slot 20 is angled downward relative to the tangent of the curved surface at its location, the slot 20 having a width and length proportionally smaller than the overall size and shape of the housing 10.

As an optional feature, the housing 10 can accommodate multiple lights 30. The present invention may include any number of lights 30 and is designed with advanced insulating materials, such as high-performance polymers and resistant alloys, ensuring an operating range of −40° F. to 140° F. (−40° C. to 60° C.). This design guarantees optimal functionality in extreme climates and extends the device's lifespan.

When two lights are installed, they can be positioned such that each light is directed in an angular direction, with one light angled to the left and the other angled to the right. This configuration provides enhanced coverage and flexibility, making the lighting assembly 30 suitable for applications requiring illumination over a broader area or in multiple directions simultaneously.

Failure Detection System 50

The failure detection system 50 of the present invention can be integrated into the lighting device 100 to ensure reliability and uninterrupted operation. It continuously monitors the status of the LED assembly 30 and detects malfunctions, such as a burned-out bulb or electrical fault. Upon detecting a failure, the system 50 generates an alert, which can be transmitted to maintenance personnel via a wired or wireless communication interface 80 or a user device 81 that can be a mobile phone or a computing device.

Figure 9:
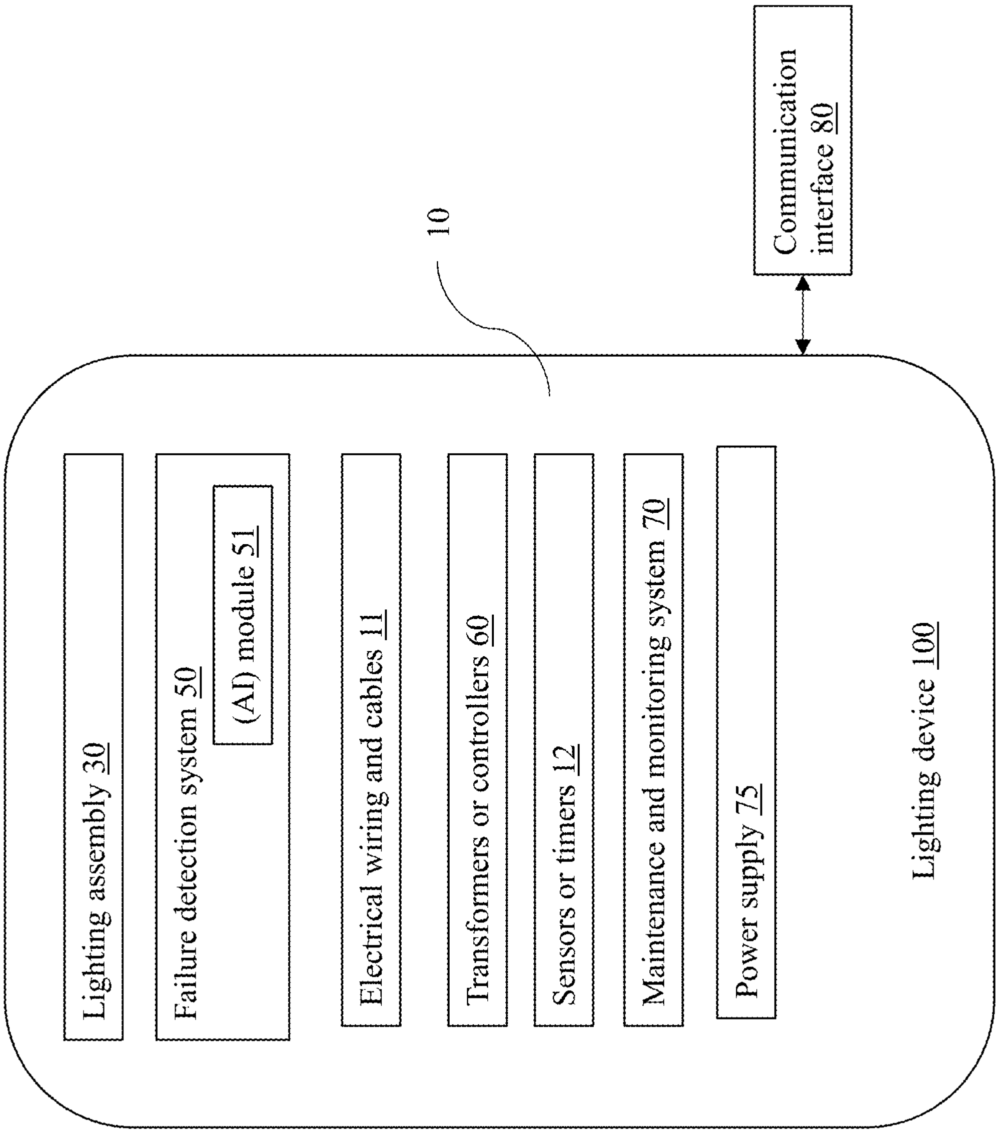
FIG. 9 is an illustration of the present invention showing the components.

In some embodiments, as shown in FIG. 9, the failure detection system 50 may be integrated with an artificial intelligence (AI) module 51 configured to enhance detection capabilities and improve performance over time through self-training. The AI module 51 may be designed to analyze and compare the previous operating status of the lighting assembly 30 with its current status to identify potential issues. If the detected issue is software-related and can be resolved through adjustments or updates to the system's software, the AI module may autonomously execute the necessary repairs. Alternatively, if the issue involves physical components, such as a malfunctioning light bulb or damaged wiring, the AI module 51 may generate a notification to alert users or maintenance personnel, ensuring timely replacement or repair of the affected components. This integration of AI enhances the reliability and efficiency of the failure detection system by enabling proactive and intelligent maintenance.

In some embodiments, the failure detection system 50 can be directly connected to the LED assembly 30 and the controller 60. It works in conjunction with the maintenance and monitoring system 70 to provide real-time diagnostics and alerts. This integration ensures that any issues with the lighting device are promptly identified and addressed, minimizing downtime and maintenance costs.

The failure detection system 50 may include different types of sensors 12, such as current sensors, voltage sensors, or thermal sensors, to monitor various aspects of the LED assembly's performance. The system's housing 10 can be made from weatherproof materials like polycarbonate or stainless steel to protect it from environmental damage. The communication interface 80 may include Wi-Fi, Bluetooth, or cellular connectivity, depending on the application. The communication interface 80 may include or communicatively connected to a user interface, including a mobile application or a web-based dashboard.

Electrical Wiring and Cables 12

The electrical wiring and cables 12 provide power and communication connectivity between the components of the lighting device 100. These cables are insulated with materials such as PVC, rubber, or cross-linked polyethylene to ensure durability and protection against environmental factors.

The cables 12 connect the LED assembly 30, transformer/controller 60, sensors 12, and failure detection system 50, ensuring seamless power and data transmission. They are routed through protective conduits or channels within the base structure (housing 10) of the device to prevent damage from external factors. The cables 12 may also link the lighting device 100 to the main power source, enabling consistent operation.

The cables 12 may vary in size, insulation material, and shielding, depending on the power requirements and environmental conditions. For example, in some embodiments, armored cables may be used in high-traffic areas to provide additional protection. The routing of the cables 12 can also vary, with options for underground installation or integration within poles or handles to suit specific applications.

Transformers or Controllers 60

The transformers or controllers 60 regulate the power supply 75 and manage the operation of the lighting device 100. In one embodiment, transformers/controllers 60 step down the voltage from the main power source to a level suitable (110V) for the LED assembly 30, while controllers 60 manage the intensity, timing, and adaptive functionality of the lights 30.

In one embodiment, the transformer 60 can be connected to the main power source (power supply 75) and the LED assembly 30, ensuring a stable and consistent power supply. The controller 60 is linked to the sensors and timers 12, and failure detection system 50, enabling centralized control of the lighting device 100. The controller 60 may process input from the sensors 12 and adjusts the lighting parameters accordingly, such as dimming the lights during low-traffic periods or increasing brightness in response to motion detection.

In some embodiments, the transformer and controller 60 can be housed in a single weatherproof enclosure or installed as separate units. The enclosure may be made from materials such as aluminum, stainless steel, or reinforced plastic to provide protection against environmental factors. The controller 60 may include programmable logic controllers (PLCs) or microcontroller-based systems, depending on the complexity of the application. Variations in functionality may include manual, semi-automated, or fully automated control systems.

Sensors and Timers 12

The sensors and timers 12 enable intelligent lighting management by detecting environmental conditions and controlling the operation of the lights 30. Sensors 12, such as photocells or motion detectors, detect ambient light levels or movement, while timers are programmed to activate or deactivate the lights at specific times.

In one embodiment, the sensors 12 can be connected to the controller 60, providing input signals that influence the operation of the LED assembly 30. For example, a photocell may signal the controller to turn on the lights at dusk and turn them off at dawn. Motion detectors (sensors 12) can trigger the lights to increase brightness when movement is detected. Timers work in conjunction with the sensors 12 to ensure the lights 30 operate only when needed, reducing energy consumption.

The sensors 12 may vary in type and sensitivity, depending on the application. For example, infrared motion detectors may be used in areas with high pedestrian traffic, while ultrasonic sensors may be preferred for detecting vehicles. The sensor may have housings that can be made from materials such as polycarbonate or stainless steel to provide durability and weather resistance. The timers 12 may include mechanical, digital, or programmable options, allowing for flexibility in scheduling.

Maintenance and Monitoring System 70

The maintenance and monitoring system 70 provides remote access to real-time data on the performance and status of the lighting device 100. This system 70 may include communication modules, such as Wi-Fi, Bluetooth, or cellular interfaces, that transmit data to a central monitoring station.

In preferred embodiment, the maintenance and monitoring system 70 is connected to the failure detection system 50, sensors 12, and controller 60, enabling comprehensive monitoring of the lighting device 100. It collects data on energy usage, operational status, and potential issues, allowing for proactive maintenance and optimization of the lighting infrastructure.

The communication modules may vary in type and range, depending on the application. For example, long-range cellular modules may be used for remote installations, while short-range Wi-Fi modules may be suitable for urban environments.

The present invention offers several key advantages that address critical challenges in roadway lighting systems. One of the primary benefits is enhanced safety. The low-profile design ensures that the light source remains shielded from direct view, effectively eliminating glare for drivers. This feature significantly improves visibility without causing discomfort or distraction, making roadways safer for both drivers and pedestrians. Additionally, the ground-level placement of the lighting device 100 reduces the risk of vehicle collisions with elevated light poles, which are a common hazard in traditional lighting systems. Another advantage of the present invention is its cost efficiency. The modular and scalable design minimizes expenses associated with installation, maintenance, and repairs. By eliminating the need for elevated poles and simplifying the overall structure, the lighting device 100 of the present invention reduces material and labor costs. This makes it a highly economical solution for roadway lighting, particularly in areas where budget constraints are a concern.

The present invention also provides exceptional durability and reliability. The hermetically sealed housing 10 protects the internal components from environmental factors such as moisture, dust, and impact, ensuring long-term performance. This robust design reduces the need for frequent maintenance, making the system highly efficient and dependable for extended use. These combined advantages make the invention a superior alternative to traditional roadway lighting systems.

Although the invention has been explained in relation to its preferred embodiment, it is to be understood that many other possible modifications and variations can be made without departing from the spirit and scope of the invention.

What is claimed is:

1. Lighting device for roadway illumination, comprising: a projector LED lighting assembly housed within a housing having a slot configured to allow light emitted by the projector LED lighting assembly to pass through, wherein the housing includes: a curved outer surface defining an upper portion and a lower portion, and a slot formed in the upper portion of the housing, the slot being positioned approximately midway between an apex of the housing and a base of the housing, wherein the slot is angled downward relative to a tangent of the curved outer surface at a location of the slot, the slot having a width and length smaller than an overall size and shape of the housing; a failure detection system operatively connected to the projector LED lighting assembly, the failure detection system configured to monitor the operational status of the projector LED lighting assembly and detect malfunctions; electrical wiring and cables configured to provide power and communication connectivity between the projector LED lighting assembly, the failure detection system, a controller module executing a computer program of the lighting device; a controller electrically connected to the projector LED lighting assembly, the controller configured to regulate a power supply and manage operation of the projector LED lighting assembly; and a maintenance and monitoring system operatively connected to the failure detection system and the controller module executing a computer program, the maintenance and monitoring system configured to provide real-time data on performance and operational status of the lighting device, wherein the lighting device is configured to provide low-profile or ground-level illumination for roadways to enhance visibility and safety.

2. The lighting device of claim 1, wherein the housing is circular to provide enhanced structural integrity and uniform light distribution.

3. The lighting device of claim 2, wherein the failure detection system is configured to detect malfunctions by monitoring voltage, current, or temperature parameters of the projector LED lighting assembly.

4. The lighting device of claim 3, wherein the lighting device further includes an artificial intelligence (AI) module integrated with the failure detection system, the controller module executing a computer program being configured to: analyze and compare stored historical operating status data of the projector LED lighting assembly with real-time operating status data to identify operational issues; execute software-based repairs autonomously if the identified operational issue is related to software functionality; and generate a notification to alert users if the identified operational issue involves physical components requiring replacement.

5. The lighting device of claim 1, wherein the controller module executing a computer program is configured to execute software-based repairs by adjusting operational parameters of the projector LED lighting assembly, including brightness, power consumption, or timing settings.

6. The lighting device of claim 1, wherein the controller module executing a computer program generates a notification to users or maintenance personnel via a wireless communication system, including Wi-Fi, Bluetooth, or cellular networks.

7. The lighting device of claim 1, wherein the maintenance and monitoring system is configured to display real-time performance data on a user interface, including a mobile application or a web-based dashboard.

8. The lighting device of claim 1, wherein the transformer or controller is configured to regulate power supply by converting input voltage to a predetermined output voltage suitable for the projector LED lighting assembly.

9. Lighting device for roadway illumination, comprising: a projector LED lighting assembly housed within a dome-shaped housing, the dome-shaped housing is sealed to ensure durability and configured to withstand weights of up to 300 kg, the dome-shaped housing includes at least one slot, the slot being tilted at an angle relative to a horizontal reference plane of the dome-shaped housing, wherein the slot is configured to direct light emitted by the projector LED lighting assembly at an angular direction, such that the emitted light forms an angle of approximately 1 to 20 degrees downward relative to the horizontal plane; a failure detection system operatively connected to the projector LED lighting assembly, the failure detection system configured to detect malfunctions by monitoring voltage, current, or temperature parameters of the projector LED lighting assembly; a controller module executing a computer program integrated with the failure detection system, the controller module executing a computer program being configured to: analyze and compare stored historical operating status data of the projector LED lighting assembly with real-time operating status data to identify operational issues; execute software-based repairs autonomously if the identified operational issue is related to software functionality; and generate a notification to alert users if the identified operational issue involves physical components requiring replacement; electrical wiring and cables configured to provide power and communication connectivity between the projector LED lighting assembly, the failure detection system, the controller module executing a computer program of the lighting device; a controller electrically connected to the projector LED lighting assembly, the controller configured to regulate a power supply and manage operation of the projector LED lighting assembly; and a maintenance and monitoring system operatively connected to the failure detection system and the controller module executing a computer program, the maintenance and monitoring system configured to provide real-time data on performance and operational status of the lighting device, wherein the lighting device is configured to provide low-profile or ground-level illumination for roadways to enhance visibility and safety.

10. The lighting device of claim 9, wherein the controller module executing a computer program generates a notification to users or maintenance personnel via a wireless communication system, including Wi-Fi, Bluetooth, or cellular networks.

11. The lighting device of claim 9, wherein the maintenance and monitoring system is configured to display real-time performance data on a user interface, including a mobile application or a web-based dashboard.

12. The lighting device of claim 11, wherein the transformer or controller is configured to regulate power supply by converting input voltage to a predetermined output voltage suitable for the projector LED lighting assembly.

13. Lighting device for roadway illumination, comprising: a projector LED lighting assembly housed within a housing; a failure detection system operatively connected to the projector LED lighting assembly, the failure detection system configured to monitor the operational status of the projector LED lighting assembly and detect malfunctions; a controller module executing a computer program integrated with the failure detection system, the controller module executing a computer program being configured to: store operational data over time to improve detection accuracy through machine learning algorithms; analyze and compare stored historical operating status data of the projector LED lighting assembly with real-time operating status data to identify operational issues; execute software-based repairs autonomously if the identified operational issue is related to software functionality; and generate a notification to alert users if the identified operational issue involves physical components requiring replacement; electrical wiring and cables configured to provide power and communication connectivity between the projector LED lighting assembly, the failure detection system, the controller module executing a computer program of the lighting device; a controller electrically connected to the projector LED lighting assembly, the controller configured to regulate a power supply and manage operation of the projector LED lighting assembly; and a maintenance and monitoring system operatively connected to the failure detection system and the controller module executing a computer program, the maintenance and monitoring system configured to provide real-time data on performance and operational status of the lighting device, wherein the lighting device is configured to provide low-profile or ground-level illumination for roadways to enhance visibility and safety.

14. The lighting device of claim 13, wherein the housing is a rectangular housing.

15. The lighting device of claim 13, wherein the lighting device further includes a transformer.

16. The lighting device of claim 14, wherein the failure detection system is configured to detect malfunctions by monitoring voltage, current, or temperature parameters of the projector LED lighting assembly.

17. The lighting device of claim 14, wherein the controller module executing a computer program is configured to execute software-based repairs by adjusting operational parameters of the projector LED lighting assembly, including brightness, power consumption, or timing settings.

18. The lighting device of claim 16, wherein the controller module executing a computer program generates a notification to users or maintenance personnel via a wireless communication system, including Wi-Fi, Bluetooth, or cellular networks.

19. The lighting device of claim 14, wherein the maintenance and monitoring system is configured to display real-time performance data on a user interface, including a mobile application or a web-based dashboard.

20. The lighting device of claim 14, wherein the controller is configured to regulate the power supply by converting input voltage to a predetermined output voltage suitable for the projector LED lighting assembly.

* * * * *